United States Patent
Ault et al.

(10) Patent No.: US 7,146,637 B2
(45) Date of Patent: Dec. 5, 2006

(54) USER REGISTRY ADAPTER FRAMEWORK

(75) Inventors: Michael Bradford Ault, Austin, TX (US); Garry Lee Child, Austin, TX (US); Larry George Fichtner, Austin, TX (US); Dah-Haur Lin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 873 days.

(21) Appl. No.: 09/895,978

(22) Filed: Jun. 29, 2001

(65) Prior Publication Data

US 2003/0014656 A1    Jan. 16, 2003

(51) Int. Cl.
| | |
|---|---|
| G06F 7/04 | (2006.01) |
| G06F 7/58 | (2006.01) |
| G06F 15/16 | (2006.01) |
| G06F 17/30 | (2006.01) |
| G06K 9/00 | (2006.01) |
| G06K 19/00 | (2006.01) |
| H04L 19/32 | (2006.01) |

(52) U.S. Cl. ........................................................ 726/8
(58) Field of Classification Search ................ 707/100, 707/102, 103, 200, 201, 203; 709/220, 221, 709/222, 223; 710/72; 717/168, 169, 171–178; 175/121; 719/310; 713/200; 726/8
See application file for complete search history.

(56) References Cited

U.S. PATENT DOCUMENTS

| | | | | |
|---|---|---|---|---|
| 4,942,552 | A | * | 7/1990 | Merrill et al. ................. 710/6 |
| 5,758,154 | A | * | 5/1998 | Qureshi .......................... 713/1 |
| 6,134,549 | A | * | 10/2000 | Regnier et al. ................. 707/9 |
| 6,219,790 | B1 | * | 4/2001 | Lloyd et al. ................... 726/14 |
| 6,301,710 | B1 | * | 10/2001 | Fujiwara ...................... 717/175 |

OTHER PUBLICATIONS

Murray et al. (William H. Murray and Chris H. Pappas, "Windows programming. An Introduction", ISBN: 0078815363).*
Chang et al. (Ku-Yaw Chang, Lih-Shyang Chen and Chi0Kong Lai, "Document-View-Presentation Pattern").*

(Continued)

*Primary Examiner*—Jacques Louis-Jacques
*Assistant Examiner*—Piotr Poltorak
(74) *Attorney, Agent, or Firm*—Duke W. Yee; Jaffrey S. LaBaw; Betty Formby

(57) ABSTRACT

A method, computer program product, and data processing system, with which a unified security policy may be implemented using existing application components with disparate security mechanisms and user registries is disclosed. The present invention provides a generic application programming interface (API) that forms a framework for creating registry adapters. Registry adapters allow a policy director (an item of software for imposing a sitewide security policy) to operate with new or unfamiliar registry types by acting as a drop-in translator for converting generic registry-access commands into operations specific to the particular registry in question.

40 Claims, 4 Drawing Sheets

OTHER PUBLICATIONS

Hadfield et al. (Hadfield et al. (Lee Hadfield, Dave Hater, Dave Bixier, "Windows NT Server 4 Security Handbook", 1997, ISBN: 078971213) and.*
Marray et al. (William H. Murray, III and Chris H. Pappas, Windows programming, an Introduction, 1990, ISBN: 0078).*
Hadfield et al. (Lee Hadfield, Dave Hater, Dave Bixler, "Windows NT Server 4 Security Handbook", 1997, ISBN: 078971213) in view of Regnier et al. (U.S. Patent No. 6134549), p. 83, 146, 169, 213, 219, 356-358.*
X/Open (X/Open Preliminary Specification, X/Open Single Sign-On Service (XSSO)- pluggable Authentication Modules, Published by the U.K. by the Open Group, Mar. 1997).*

Zhang et al., "An Integrated Approach for Database Security and Fault Tolerance", Proceedings of the International Conference on Information Technology: Coding and Computing, 2004, pp. 762-766.
Zhang et al., "An Efficient Authentication Scheme with Fault Tolerance for Database Systems", Proceedings of the Third International Conference on Information Technology and Applications, 2005, pp. 448-453.
Mohan, "Privacy and Authentication Protocols for PCS", IEEE Personal Communications, vol. 3, Issue 5, Oct. 1996, pp. 34-38.

* cited by examiner

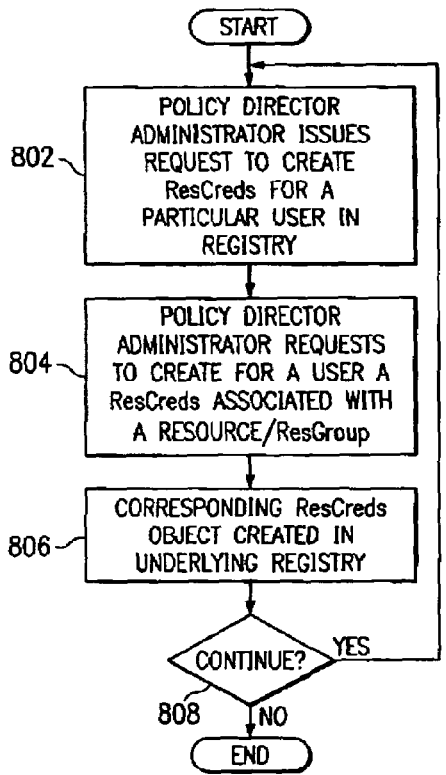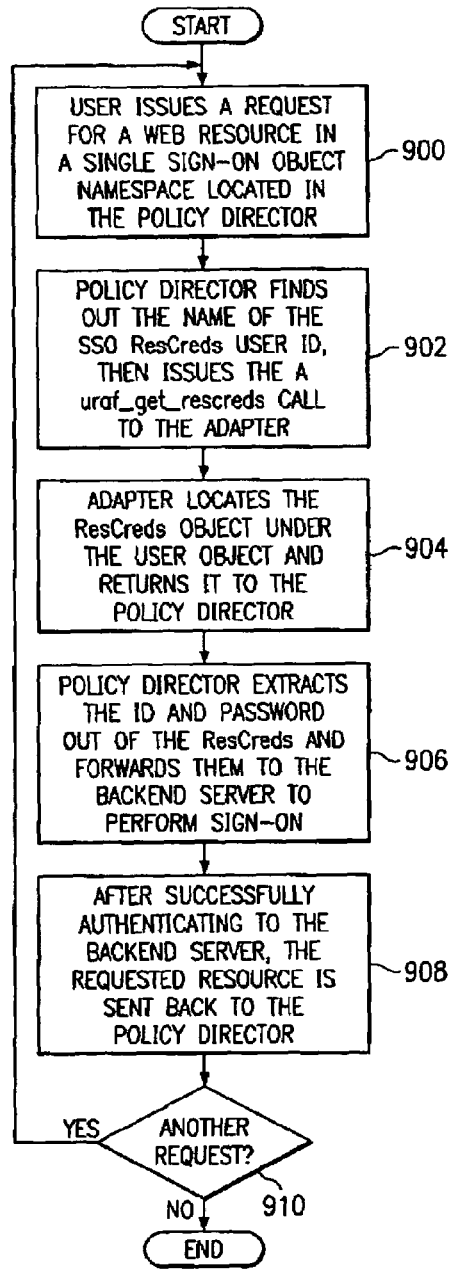

ered, and with reference the accompanying the following detailed description of an embodiments of the invention, like reference numerals.

USER REGISTRY ADAPTER FRAMEWORK

BACKGROUND OF THE INVENTION

1. Technical Field

The present invention is related to security systems for use with large sites on the World Wide Web. More specifically, the present invention provides a method, computer program product, and data processing system for allowing centralized access to information in disparate user registries across networked data processing system.

2. Description of Related Art

The Internet, also referred to as an "internetwork," is a set of computer networks, possibly dissimilar, joined together by means of gateways that handle data transfer and the conversion of messages from protocols of the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

The Internet also is widely used to transfer applications to users using browsers. With respect to commerce on the Web, individual consumers and business use the Web to purchase various goods and services. In offering goods and services, some companies offer goods and services solely on the Web while others use the Web to extend their reach.

In recent years, organizations have expanded the role of the Web from a mere disseminator of information to an integral part of business operations. Organizations increasingly rely on the Web to provide essential business services, such as allowing customers to view their accounts online or to allow internal employees to access internal information over the Internet for use while working from home.

As organizations move from providing static content to providing key services, the amount of sensitive data becoming accessible over the Web is increasing steadily. This has brought about a major change in the requirements for data security over the Web. It is no longer sufficient to "keep the bad guys out." Organizations with a strong web presence must not only keep out unauthorized users, but must also keep authorized users from accessing data and applications they should not be allowed to access.

To complicate matters, even sophisticated websites are often a hodge-podge of various applications and servers, each with their own authentication systems and user registries (the databases that store data for use in authenticating users). Rewriting each and every application on a site so as to implement a unified security policy is a Herculean task. To provide effective site-wide security over a complex website, however, some sort of centralized access control is needed, so that authorized users may access only those resources they are authorized to access. It would also be beneficial if a user need only sign onto the site once, rather than for each time a new application is accessed.

What is needed then, is a system whereby a unified security policy may be implemented in a website having disparate user registries and authentication mechanisms.

SUMMARY OF THE INVENTION

The present invention provides a method, computer program product, and data processing system, with which a unified security policy may be implemented using existing application components with disparate security mechanisms and user registries. The present invention provides a generic application programming interface (API) that forms a framework for creating registry adapters.

A policy director server authenticates a user using data stored in a registry associated with an existing application. The policy director issues generic registry-independent function calls taken from the API to a registry adapter. The registry adapter is custom-made to operate with the particular registry in question. The registry adapter, in response to the function calls, performs registry-dependent operations on the registry and returns the results to the policy director, thus obviating the need for the policy director to be programmed to operate with each type of registry. The policy director may be made to operate with a new type of registry by simply pairing it with a new registry adapter made to operate with the new registry type and exporting the API so as to make it accessible to the policy director.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8 is a flowchart representation of a single sign-on administration of a URAF_ResCreds Object in a preferred embodiment of the present invention; and FIG. 9 is a flowchart representation of a complete single sign-on task between an application, a URAF adapter, and all related objects in the underlying registry in a preferred embodiment of the present invention.

DETAILED DESCRIPTION OF THE PREFERRED EMBODIMENT

Figure 1:
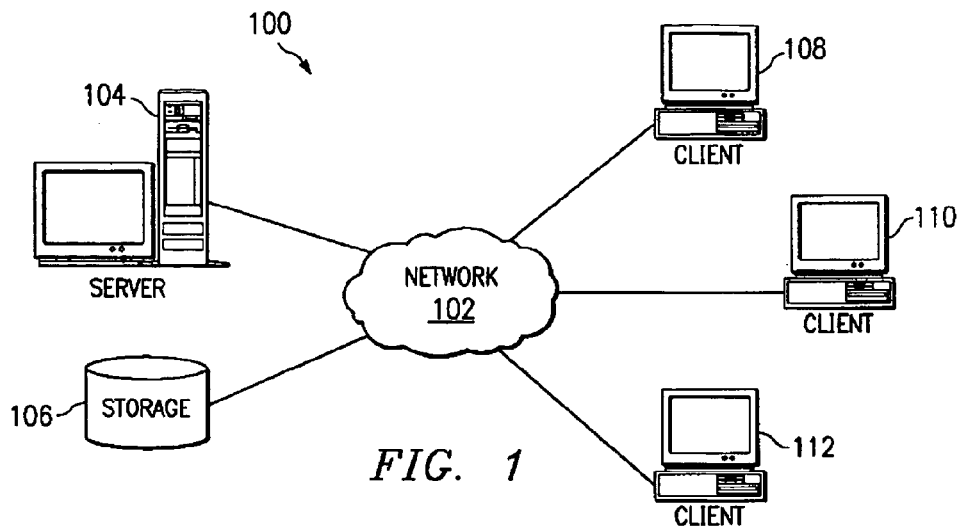
FIG. 1 is a pictorial representation of a network of data processing systems in which the present invention may be implemented.

With reference now to the figures, FIG. 1 is a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
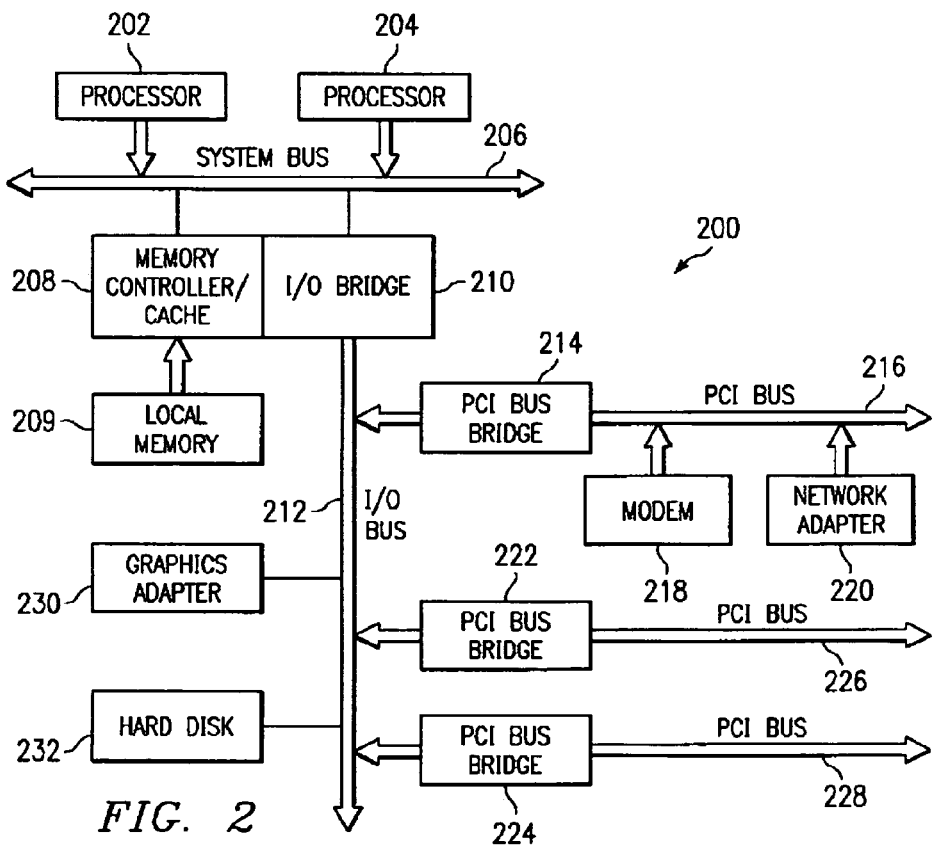
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pseries, a product of International Business Machines Corporation in Armonk, N.Y., running the Advanced Interactive Executive (AIX) operating system, or alternatively, the Linux operating system, which is freely available for a number of hardware platforms.

Figure 3:
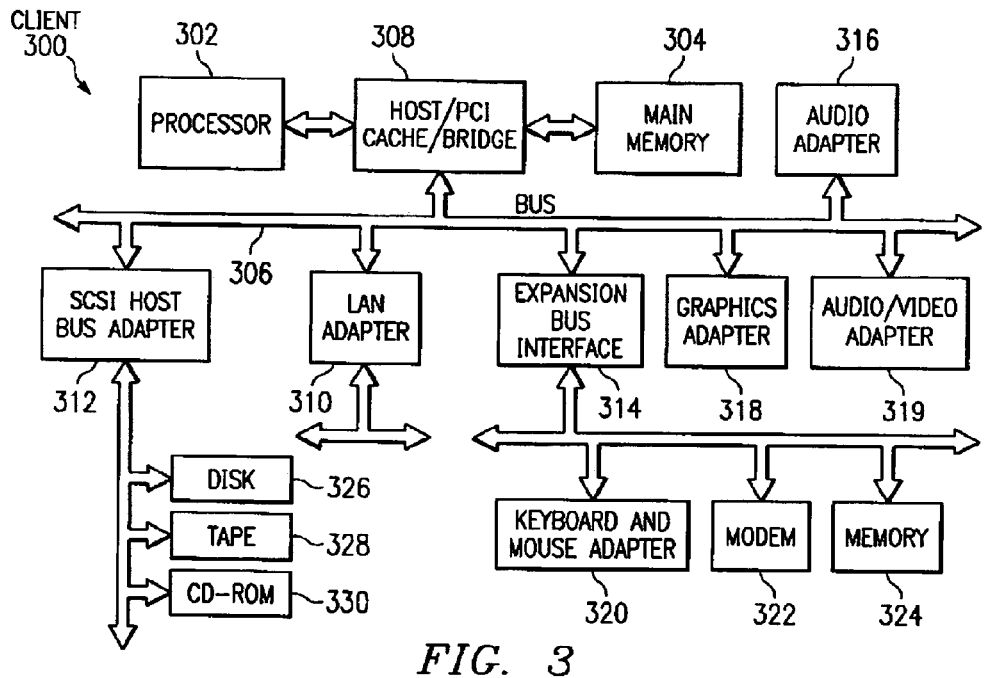
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
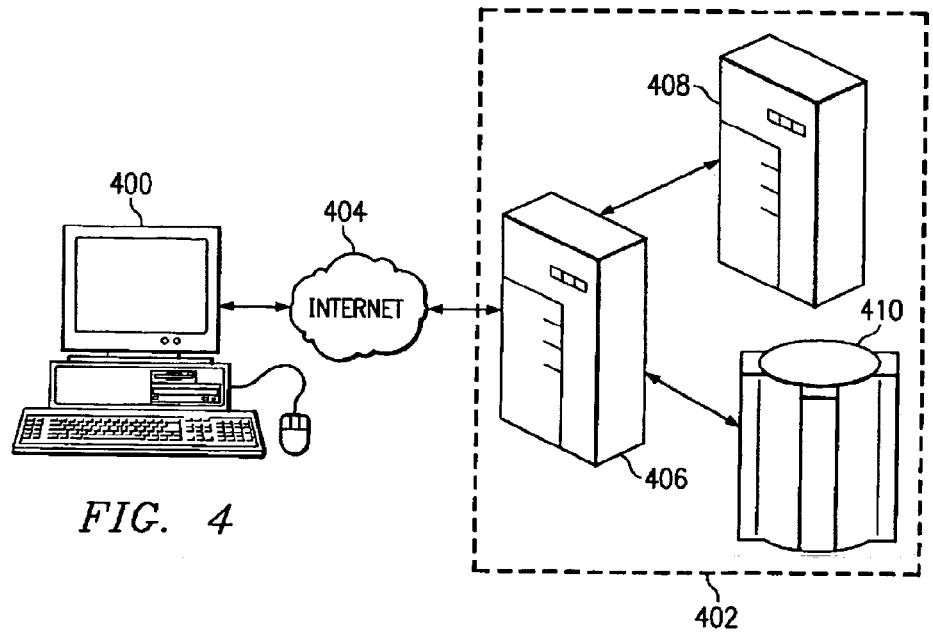
FIG. 4 depicts a networked computing environment in accordance with a preferred embodiment of the present invention.

FIG. 4 more specifically depicts a networked computing environment in accordance with a preferred embodiment of the present invention. Client computer 400 accesses intranet 402 through Internet 404. An authentication gateway server 406 containing policy director software acts as a single entry-point to the rest of intranet 402, namely server 408 and server 410.

Authentication gateway server 406 allows or denies client computer 400 access to the resources of servers 408 and 410 based on a single-signon system. In other words, the user of client computer 400 provides a single username and password to authentication gateway server 406 and then is allowed access to the other servers in intranet 402. The user of client computer 400, however, may have varying levels of access to different servers, once signed on. For instance, although a user may be signed onto the intranet as a whole, the user might not be allowed to access all intranet resources (including hardware resources such as servers, clients, and peripheral devices, and software resources such as applications), once signed on.

In a typical intranet pieced together from existing "off-the-shelf" components, each application or server will have its own registry of users, user groups, and other application-specific objects-the information each application or server itself uses to authenticate users. Having all of this authentication information distributed in this way, among different software and hardware components, makes providing a single-signon difficult. In order to authenticate a user when a user may have access to some resources, but not others, policy director software needs to have a way of accessing the various user registries throughout the intranet. Thus, the present invention provides a technique by which existing hardware and software components may be made to interact with policy director software, so as to provide single-signon capability readily and to also allow for central establishment of users, user groups, and policies across disparate application platforms.

One of ordinary skill in the art will note that the processes of the present invention will apply with equal utility in the situation where client computer 400 is within intranet 402, rather than connected through Internet 404.

Figure 5:
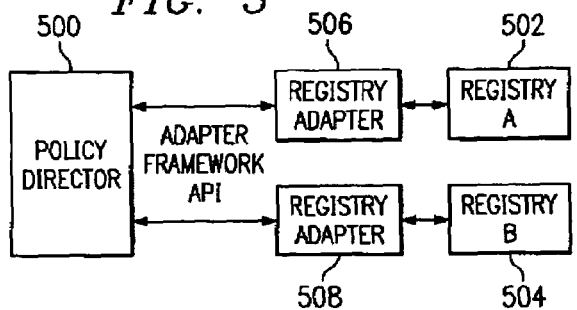
FIG. 5 is a block diagram depicting policy director software communicating with disparate registries through registry adapters.

FIG. 5 is a block diagram depicting policy director software 500 communicating with disparate registries 502 and 504 through registry adapters 506 and 508. Registry adapters 506 and 508 are custom-written to interact with registries 502 and 504, respectively. Registry adapters 506 and 508, on the other hand, communicate with policy director software 500 through a unified application programming interface (API), called a "User Registry Adapter Framework" or "URAF."

The API is a vocabulary of function definitions that provide a single interface that policy director 500 may use to communicate with any registry adapter. The actual program code corresponding to each of the function definitions within the API is custom tailored for each registry. Thus, each registry adapter acts as a translator, receiving function calls from policy director 500 to perform particular tasks, then performing the tasks on a particular registry.

In this way, existing registry systems may be incorporated with existing policy director software by simply writing a registry adapter that includes program code for each of the functions in the API. In a preferred embodiment, a registry adapter is compiled as a dynamically-linked library (DLL), so that it may be loaded by policy director software 500 as needed, without rebuilding any existing software components, such as policy director software 500.

In a preferred embodiment, the API adopts an object-oriented approach to handling registry data. Each basic data concept is associated with a particular object class. Thus, a preferred embodiment of the API recognizes objects corresponding to users, user groups, policies, resources, resource groups, and resource credentials. A preferred embodiment also recognizes objects representing lists of the previously-mentioned objects. Each of these objects contains a number of data fields representing properties of that object. For instance, a "User" object will have a "firstName" field, containing a user's first (given) name. Table I provides a list of basic object classes with associated data fields in a preferred embodiment of the present invention. Objects that represent lists of these basic objects are called URAF_User List, URAF_GroupList, URAF_PolicyList, and so forth. It should be noted that Table I is merely an example of the kinds of objects that may be included in an embodiment of the present invention; it is by no means exhaustive or exclusive. Actual embodiments of the present invention may employ more, fewer, or different classes than those described in Table I.

TABLE I

Object Classes and their Fields

| Primary Data Object | Data Field in the Object | Field Description |
|---|---|---|
| URAF_User | userID | Policy Director user ID |
| | domainName | Policy Director domain name |
| | description | User description |
| | type | User type |
| | uuid | Unique object identification |
| | accountValid | User account valid |
| | authnDataValid | Authentication data valid |
| | authnData | Authentication data |
| | loginTypes | Login types |
| | firstName | User's first name |
| | middleName | User's middle name |
| | lastName | User's last name |
| | registryUID | Registry specific user ID |
| | failedlogins | Number of failed logins |
| | pwdLastChanged | Password last changed time |
| | lastLogin | Last successful login time |
| | policyID | Policy ID for this user |
| | properties | Registry specific data |
| | blob | For future data requirements |
| URAF_Group | groupID | Policy Director group ID |
| | domainName | Policy Director domain name |
| | description | Group description |
| | type | Group type |
| | uuid | Unique object identification |
| | valid | Group valid |
| | registryGID | Registry specific group ID |
| | members | List of users in this group |
| | properties | Registry specific data |
| | blob | For future data requirements |
| URAF_Policy | policyID | Policy Director policy ID |
| | domainName | Policy Director domain name |
| | description | Policy description |
| | type | Policy type |
| | uuid | Unique object identification |
| | valid | Policy valid |
| | acctExpires | Account expiration time |
| | acctLife | Account lifetime in seconds |
| | acctInactivity | Account inactivity seconds |
| | acctFailedLockout | Account lockout in seconds |
| | maxFailedLogins | Max allowed login failures |
| | pwdMinLen | Minimum password length |
| | pwdMaxLen | Maximum password length |
| | pwdAlphaOnly | Alpha only password allowed |
| | pwdSpacesAllowed | Spaces allowed in password |
| | loginRestrictions | Login restrictions string |
| | properties | Registry specific data |
| | blob | For future data requirements |
| URAF_Resource | resourceID | Policy director resource ID |
| | description | Resource description |
| | type | Resource type |
| | uuid | Unique object identification |
| | valid | Resource valid |
| | properties | Registry specific data |
| | blob | For future data requirements |
| URAF_ResGroup | resgroupID | Policy Director resgroup ID |
| | description | Resource group description |
| | type | Resource group type |
| | uuid | Unique object identification |
| | valid | Resource group valid |
| | members | Resources in this resgroup |
| | properties | Registry specific data |
| | blob | For future data requirements |
| URAF_ResCreds | rescredsID | Policy Director rescreds ID |
| | description | Resource creds description |
| | type | Resources creds type |
| | uuid | Unique object identification |
| | valid | Resource credentials valid |
| | uid | Resource user ID |
| | authnData | Resource authentication data |
| | properties | Registry specific data |
| | blob | For future data requirements |

Each object class has methods associated with it. For instance, an object class representing a list of users has associated methods for accessing the first element of the list and the each next element in the list.

One of ordinary skill in the art will recognize that this object-oriented data organization need not be implemented using an object-oriented programming language, such as C++ or Java. A procedural language, such as C, may be used to implement an object-oriented API in accordance with the present invention. Typically, when a procedural language is used to implement an object-oriented API, objects are replaced with some type of structured data type (such as a C struct, or a Pascal record), and the object methods will be replaced with functions that take the object's structured data type (or some kind of pointer or handle representing a structured datatype) as an argument. For example, a call to an object's method in C++ or Java, "object.method(x)" would be replaced with a function call resembling "method (object,x)" in C.

In a preferred embodiment, API functions (or methods) return a completion status code. This code can be interpreted to tell whether an API function completed successfully.

In a preferred embodiment, API functions exist for reading, modifying, and making use of all of the various object classes. Table II provides a representative listing of API functions and the tasks they perform in a preferred embodiment of the present invention. It should be noted that Table II is merely an example of the kinds of functions that may be included in an embodiment of the present invention; it is by no means exhaustive or exclusive. Actual embodiments of the present invention may employ more, fewer, or different functions than those described in Table II.

TABLE II

API Functions

INITIALIZATION/TERMINATION FUNCTIONS uraf_router - Route requests to the proper adapter
uraf_initialize - Initialization of URAF
uraf_terminate - Termination of URAF
MISCELLANEOUS FUNCTIONS uraf_version - Get the URAF implementation version number
uraf_registry_type - Get the URAF implementation registry type
uraf_authn_type - Get the URAF implementation authentication type
uraf_extensions - Get URAF implementation extensions
REGISTRY PROPERTY FUNCTIONS uraf_registry_properties - Get URAF registry specific properties
uraf_alloc_properties - Allocate a URAF_Properties object
uraf_free_properties - Free a URAF_Properties object
MEMORY MANAGEMENT FUNCTIONS uraf_alloc - Allocate memory
uraf_strdup - String duplication
uraf_free - Free memory
uraf_alloc_user - Allocate a URAF_User object
uraf_alloc_userlist - Allocate a URAF_UserList object
uraf_free_user - Free a URAF_User object
uraf_free_userlist - Free a URAF_UserList object
uraf_alloc_group- Allocate a URAF_Group object
uraf_alloc_grouplist - Allocate a URAF_GroupList object
uraf_free_group - Free a URAF_Group object
uraf_free_grouplist - Free a URAF_GroupList object
uraf_alloc_policy - Allocate a URAF_Policy object
uraf_alloc_policylist - Allocate a URAF_PolicyList object
uraf_free_policy - Free a URAF_Policy object
uraf_free_policylist - Free a URAF_PolicyList object
uraf_alloc_resource - Allocate a URAF_Resource object
uraf_alloc_resourcelist - Allocate a URAF_ResourceList object
uraf_free_resource - Free a URAF_Resource object
uraf_free_resourcelist - Free a URAF_ResourceList object
uraf_alloc_resgroup - Allocate a URAF_ResGroup object
uraf_alloc_resgrouplist - Allocate a URAF_ResGroupList object

TABLE II-continued

Figure 6:
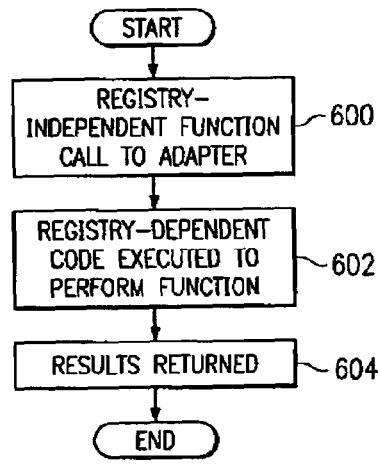
FIG. 6 is a flowchart representation of a process of a policy director's accessing registry data in a preferred embodiment of the present invention.

API Functions uraf_free_resgroup - Free a URAF_ResGroup object
uraf_free_resgrouplist - Free a URAF_ResGroupList object
uraf_alloc_rescreds - Allocate a URAF_ResCreds object
uraf_alloc_rescredslist - Allocate a URAF_ResCredsList object
uraf_free_rescreds - Free a URAF_ResCreds object
uraf_free_rescredslist - Free a URAF_ResCredsList object
uraf_alloc_authndata - Allocate a URAF_AuthnData structure (for holding authentication data)
uraf_free_authndata - Free a URAF_AuthnData structure
uraf_alloc_logintypes - Allocate a URAF_logintypes structure
uraf_free_logintypes - Free a URAF_logintypes structure
uraf_alloc_resgroupmembers - Allocate a URAF_ResGroupMembers structure
uraf_free_resgroupmembers - Free a URAF_ResGroupMembers structure
uraf_alloc_blob - Allocate a URAF_blob structure
uraf_free_blob - Free a URAF_blob structure
USER MANAGEMENT FUNCTIONS uraf_authenticate_user - Authenticate user in the Registry
uraf_change_authndata - Change authentication data in the Registry
uraf_create_user - Create a new user in the Registry
uraf_delete_user - Delete a user from the Registry
uraf_enable_user - Enable a user for Policy Director use
uraf_disable_user - Disable a user for Policy Director use
uraf_get_user - Get user data from the Registry
uraf_get_user_by_uuid - Get user data from the Registry by UUID
uraf_user_grouplist - Get list of groups user belongs to
uraf_get_userlist - Get list of users from the Registry
uraf_first_user - Get first user from list of users
uraf_next_user - Get next user from list of users
uraf_previous_user - Get previous user from list of users
GROUP MANAGEMENT FUNCTIONS uraf_create_group - Create a new group in the Registry
uraf_delete_group - Delete a group from the Registry
uraf_enable_group - Enable a group for Policy Director use
uraf_disable_group - Disable a group for Policy Director use
uraf_modify_group - Modify a group in the Registry
uraf_add_group_member - add a user to a group in the Registry
uraf_remove_group_member - remove a user from a group in the Registry
uraf_get_group - Get group data from the Registry
uraf_get_group_by_uuid - Get group data from the Registry by UUID
uraf_get_grouplist - Get list of groups from the Registry
uraf_first_group - Get first group from list of groups
uraf_next_group - Get next group from list of groups
uraf_previous_group - Get previous group from list of groups
POLICY MANAGEMENT FUNCTIONS uraf_create_policy - Create a new policy in the Registry
uraf_delete_policy - Delete a policy from the Registry
uraf_modify_policy - Modify a policy in the Registry
uraf_get_policy - Get policy data from the Registry
uraf_get_policylist - Get list of policy data from the Registry
uraf_first_policy - Get first policy from policy list
uraf_next_policy - Get next policy from policy list
uraf_previous_policy - Get previous policy from policy list
RESOURCE MANAGEMENT FUNCTIONS uraf_create_resource - Create a new resource in the Registry
uraf_delete_resource - Delete a resource from the Registry
uraf_modify_resource - Modify a resource in the Registry
uraf_get_resource - Get resource data from the Registry
uraf_get_resourcelist - Get list of resource data from the Registry
uraf_first_resource - Get first resource from resource list
uraf_next_resource - Get next resource from resource list
uraf_previous_resource - Get previous resource from resource list
RESGROUP MANAGEMENT FUNCTIONS uraf_create_resgroup - Create a new resgroup in the Registry
uraf_delete_resgroup - Delete a resgroup from the Registry
uraf_modify_resgroup - Modify a resgroup in the Registry
uraf_get_resgroup - Get resgroup data from the Registry uraf_get_resgrouplist - Get list of resgroup data from the Registry
uraf_first_resgroup - Get first resgroup from resgroup list
uraf_next_resgroup - Get next resgroup from resgroup list
uraf_previous_resgroup - Get previous resgroup from resgroup list
RESCREDS MANAGEMENT FUNCTIONS uraf_create_rescreds - Create a new rescreds in the Registry
uraf_delete_rescreds - Delete a rescreds from the Registry
uraf_modify_rescreds - Modify a rescreds in the Registry
uraf_get_rescreds - Get rescreds data from the Registry
uraf_get_rescredslist - Get list of rescreds data from the Registry
uraf_first_rescreds - Get first rescreds from rescreds list
uraf_next_rescreds - Get next rescreds from rescreds list
uraf_previous_rescreds - Get previous rescreds from rescreds list FIG. 6 is a flowchart representation of a process of a policy director's accessing registry data in a preferred embodiment of the present invention. First, the policy director issues a registry-independent function call to a function within the URAF API (step 600). Next, the registry-specific registry adapter code associated with the function call and corresponding to the particular registry to be accessed is executed (step 602). Finally, any results, including completion codes, are returned to the policy director (step 604).

Figure 7:
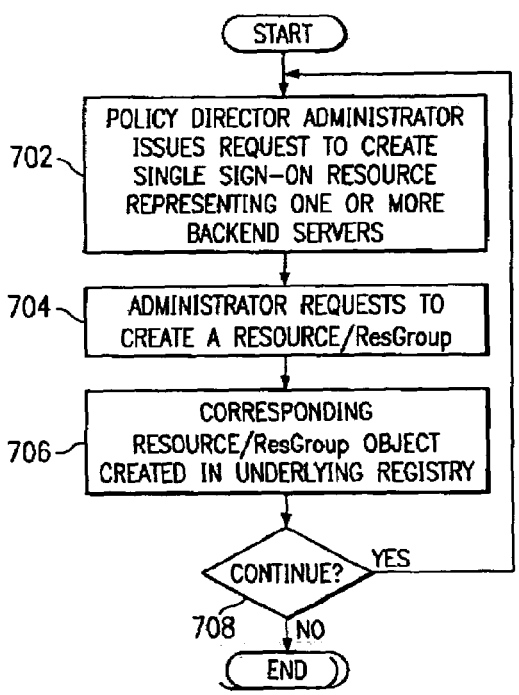
FIG. 7 is a flowchart representation of a single sign-on administration of both URAF_Resource and URAF_ResGroup objects in a preferred embodiment of the present invention.

FIGS. 7, 8, and 9 depict a single sign-on system in accordance with a preferred embodiment of the present invention and in view of the interaction between policy director software, a URAF adapter and the underlying registry.

FIG. 7 is a flowchart representation of the operation of a single sign-on administration from the perspective of URAF_Resource and URAF_ResGroup objects. The process starts with setting up required objects in the registry (registry 502, for instance) to perform single sign-on task. The administrator of policy director software 500 first issues a request to create a single sign-on (SSO) Resource or ResGroup (step 702). Each SSO Resource object represents a backend HTTP server while each SSO ResGroup object contains multiple SSO Resources (i.e., multiple backend HTTP servers). If an SSO resource is to be made, an uraf_create_resource function call from the API is made from policy server 500 to URAF adapter 506; if an SSO ResGroup is to be made instead, a call to uraf_create_resgroup will be made (step 704). Depending on which function was called, URAF adapter 506 will in turn create either a URAF_Resource object or a URAF_ResGroup object in registry 502 (step 706). This process can be repeatedly performed (step 708) by the administrator of policy director 500 based on the user's configured environment.

FIG. 8 is a flowchart representation of the operation of a single sign-on administration from the perspective of a URAF_ResCreds object. Each URAF_ResCreds contains a user's identification and password, which can be used to sign on to a backend server. In the case that the backend server is an HTTP server, this authentication can take place via the HTTP basic-authentication protocol, described in Internet Request for Comments (RFC) 2617.

The URAF_ResCreds object administration process starts with a request issued from the administrator of policy director software 500 to create an SSO ResCreds for a particular user (step 802). A call to uraf_create_rescreds interface call will be issued to URAF adapter 506 to create a URAF_ResCreds object associated with a URAF_Resource or a URAF_ResGroup (step 804). The adapter then in turn creates a URAF_ResCreds object under the user object corresponding to the user in question in registry 502 (step 806). This procedure can, be repeated (step 808) by the administrator of policy director software 500.

Once the administration flows in FIG. 7 and FIG. 8 are completed, the environment is ready for user to perform web single sign-on. FIG. 9 is a flowchart representation of the actual single sign-on task between application, URAF adapter, and all the related objects in underlying registry.

The user starts from requesting a web resource in a SSO object name space located in policy director software 500 (step 900). When the request is received by the policy director software 500, the SSO ResCreds name and user's id associated with the requested web resource will be used by policy director software 500 to retrieve the user's id and password for signing onto the backend server.

Specifically, the uraf_get_rescreds interface will be issued to URAF adapter 506 (step 902). Adapter 506 will then locate the SSO ResCreds name under the requested user object, and return the ResCreds object back to policy director software 500 (step 904). Upon receiving the ResCreds object, policy director software 500 then extracts the user id and password stored in the ResCreds object, and forwards them to the backend server to perform authentication on behalf of the user (step 906). After successfully, authenticating to the backend server, the user requested resource (e.g., a web resource) will be sent back from the server to policy director software 500, which in turn passes it back to the user and completes the single signon task for the user (step 908). If policy director software 500 receives another request (step 910), the process cycles to step 900. Otherwise, the process terminates.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMS, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for accessing a user registry, comprising:
    configuring a plurality of user registries in a given computer system to each receive instructions through a respective adapter and to each provide access to a respective system resource, wherein ones of said plurality of user registries used by different respective authentication mechanisms and wherein each said respective adapter is configured to receive instructions in a common format; and
    sending a registry-independent instruction to perform an operation on a given user registry of said plurality of user registries, wherein, responsive to receiving said registry-independent instruction, a respective adapter translates said instruction from said common format to a format usable with said given user registry to create a translated instruction, and forwards said translated instruction to said given user registry, wherein said translated instruction is performed at said given user registry to modify access to a respective system resource associated with said given user registry.

2. The method of claim 1, wherein the registry-independent instruction is a function call.

3. The method of claim 2, wherein the function call is to a function in a dynamically-linked library (DLL).

4. The method of claim 2, wherein the function call is to a function that takes a structured data type as an argument, wherein the structured data type represents a data object within said given user registry.

5. The method of claim 2, wherein the function call is to a method of an object class in an object-oriented programming language.

6. The method of claim 1, wherein the operation includes reading data from said given user registry.

7. The method of claim 1, wherein the operation includes writing data to said given user registry.

8. The method of claim 1, wherein the operation is performed with respect to a data object in said given registry.

9. The method of claim 8, wherein the data object is one of a user object, a group object, a policy object, a resource object, a resource group object, a resource credentials abject, and a list of objects.

10. A method for accessing a user registry, comprising:
    configuring a first user registry to receive communications only through first registry adapter and configuring a second user registry to receive communications only through a second registry adapter;
    sending all instructions to said first user registry and said second user registry using a common format that is not usable by said first user registry and said second user registry;
    receiving, in said first registry adapter, a registry-independent instruction designed to perform an operation on a first registry;
    translating said registry-independent instruction into a registry-dependent instruction that is usable by said first user registry and forwarding said first registry dependent instruction to said first registry where said operation is performed to modify access to a system resource associated with said first user registry.

11. The method of claim 10, wherein the registry-independent instruction is a function call.

12. The method of claim 11, wherein the function call is to a function in a dynamically-linked library (DLL).

13. The method of claim 11, wherein the function call is to a function that takes a structured data type as an argument, wherein the structured data type represents a data object within said first user registry.

14. The method of claim 11, wherein the function call is to a method of an object class in an object-oriented programming language.

15. The method of claim 10, wherein the operation includes reading data from said first user registry.

16. The method of claim 10, wherein the operation includes writing data to said first user registry.

17. The method of claim 10, wherein the operation is performed with respect to a data object in said first user registry.

18. The method of claim 17, wherein the data object is one of a user object, a group object, a policy object, a resource object, a resource group object, a resource credentials object, and a list of objects.

19. The method of claim 10, further comprising instructions for receiving a completion status code.

20. A computer program product in a computer readable medium for accessing a user registry, comprising instructions for:
configuring a plurality of user registries in a given computer system to each receive instructions through a respective adapter and to each provide access to a respective system resource, wherein ones of said plurality of user registries are used by different authentication mechanisms and wherein each said respective adapter is configured to receive instructions in a common format;
sending a registry-independent instruction to perform an operation on a given user registry of said plurality of user registries, wherein, responsive to receiving said registry-independent instruction, a respective adapter translates said instruction from said common format to a format usable with said given user registry to create a translated instruction, and forwards said translated instruction to said given user registry, wherein said translated instruction is performed at said given user registry to modify access to a respective system resource associated with said given user registry.

21. The computer program product of claim 20, wherein the registry-independent instruction is a function call.

22. The computer program product of claim 21, wherein the function call is to a function in a dynamically-linked library (DLL).

23. The computer program product of claim 21, wherein the function call is to a function that takes a structured data type as an argument, wherein the structured data type represents a data object within said given user registry.

24. The computer program product of claim 21, wherein the function call is to a method of an object class in an object-oriented programming language.

25. The computer program product of claim 20, wherein the operation includes reading data from said given user registry.

26. The computer program product of claim 20, wherein the operation includes writing data to said user registry.

27. The computer program product of claim 20, wherein the operation is performed with respect to a data object in said given registry.

28. The computer program product of claim 27, wherein the data object is one of a user object, a group object, a policy object, a resource object, a resource group object, a resource credentials object, and a list of objects.

29. A computer program product in a computer readable medium for accessing a user registry, comprising instructions for:
receiving, in a registry adapter that has been configured to receive all communications for a first user registry, a registry-independent instruction designed to perform an operation on said first user registry, wherein said registry-independent instruction is in a common format that is not usable by said first registry;
translating said registry-independent instruction into a registry-dependent instruction and sending said registry-dependent instruction to said first user registry,
wherein said translated instruction is performed at said first user registry to modify access to a system resource associated with said first user registry, and wherein the registry adapter is one of a plurality of adapters and the first user registry is one of a plurality of user registries used by different authentication mechanisms.

30. The computer program product of claim 29, wherein the registry-independent instruction is a function call.

31. The computer program product of claim 30, wherein the function call is to a function in a dynamically-linked library (DLL).

32. The computer program product of claim 30, wherein the function call is to a function that takes a structured data type as an argument, wherein the structured data type represents a data object within said first user registry.

33. The computer program product of claim 30, wherein the function call is to a method of an object class in an object-oriented programming language.

34. The computer program product of claim 29, wherein the operation includes reading data from said first user registry.

35. The computer program product of claim 29, wherein the operation includes writing data to said first user registry.

36. The computer program product of claim 29, wherein the operation is performed with respect to a data object in said first registry.

37. The computer program product of claim 36, wherein the data object is one of a user object, a group object, a policy object, a resource object, a resource group object, a resource credentials object, and a list of objects.

38. The computer program product of claim 29, further comprising instructions for receiving a completion status code.

39. A data processing system, comprising:
a bus system;
a plurality of user registries connected to said bus system, wherein each registry of said plurality of user registries is connected to receive instructions through a respective adapter and to provide access to a respective system resource, wherein ones of said plurality of user registries are utilized by different authentication mechanisms and each said respective adapter is configured to receive instructions in a common format;
a processing unit connected to the bus system, wherein the processing unit includes at least one processor; memory; and
a set of instructions in the memory, wherein the processing unit executes the set of instructions to perform the acts of: sending a registry-independent instruction to perform an operation on a given user registry of said plurality of registries, wherein, responsive to receiving said registry-independent instruction, a respective adapter translates said instruction from said common format to a format usable with said given user registry to create a translated instruction, and forwards said translated instruction to said given user registry, wherein said translated instruction is performed at said given user registry to modify access to a respective system resource associated with said given user registry.

40. A data processing system, comprising:
a bus system;
a processing unit connected to the bus system, wherein the processing unit includes at least one processor;

a plurality of user registries accessed through said bus system and each configured to receive all communications through a respective registry adapter, wherein communications are sent to said respective registry adapters in a common format that is registry-independent;

memory; and a set of instructions in the memory, wherein the processing unit executes the set of instructions to perform the acts of:

receiving a registry-independent instruction in a first registry adapter to perform an operation on a respective first user registry of said plurality of user registries;

translating said registry-independent instruction from said common format to a format usable with said given user registry to create a registry-dependent instruction, and sending registry-dependent instructions to perform the operation on the user registry and sending a result of the operation.

* * * * *